United States Patent
Matsumoto et al.

(10) Patent No.: US 10,356,836 B2
(45) Date of Patent: Jul. 16, 2019

(54) USER TERMINAL AND BASE STATION FOR PERFORMING UPLINK TRANSMISSION IN AN UNLICENSED BAND

(71) Applicant: KYOCERA CORPORATION, Kyoto (JP)

(72) Inventors: Naohisa Matsumoto, Higashiomi (JP); Noriyoshi Fukuta, Inagi (JP); Kugo Morita, Higashiomi (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/547,869

(22) PCT Filed: Feb. 5, 2016

(86) PCT No.: PCT/JP2016/053480
§ 371 (c)(1),
(2) Date: Aug. 1, 2017

(87) PCT Pub. No.: WO2016/125888
PCT Pub. Date: Aug. 11, 2016

(65) Prior Publication Data
US 2018/0027553 A1 Jan. 25, 2018

Related U.S. Application Data

(60) Provisional application No. 62/112,764, filed on Feb. 6, 2015.

(51) Int. Cl.
*H04W 72/04* (2009.01)
*H04W 76/19* (2018.01)
(Continued)

(52) U.S. Cl.
CPC ........... *H04W 76/19* (2018.02); *H04L 5/0032* (2013.01); *H04W 16/14* (2013.01); *H04W 16/32* (2013.01);
(Continued)

(58) Field of Classification Search
CPC ..... H04W 76/10; H04W 76/15; H04W 76/14; H04W 76/23; H04W 36/0027; H04W 72/0413; H04W 16/32
See application file for complete search history.

(56) References Cited

U.S. PATENT DOCUMENTS

| 2012/0155406 A1* | 6/2012 | Kim ........................ H04W 4/70 370/329 |
| 2014/0036818 A1* | 2/2014 | Koskela ............ H04W 72/1231 370/329 |

(Continued)

FOREIGN PATENT DOCUMENTS

JP 2014-027429 A 2/2014

OTHER PUBLICATIONS

International Search Report issued in PCT/JP2016/053480; dated Apr. 26, 2016.

(Continued)

*Primary Examiner* — Hassan Kizou
*Assistant Examiner* — Mahbubul Bar Chowdhury
(74) *Attorney, Agent, or Firm* — Studebaker & Brackett PC

(57) ABSTRACT

A user terminal according to a first aspect is used in a mobile communication system. The user terminal comprises: a receiver configured to receive, from a base station, candidate timing information indicating candidate timings of an uplink transmission on an unlicensed band channel that is a frequency channel of an unlicensed band; a controller configured to determine, by monitoring the unlicensed band channel, a transmission timing at which the uplink transmission to the base station is performed, from the candidate timings indicated by the candidate timing information; and a trans- (Continued)

mitter configured to transmit, at the transmission timing, uplink data via the unlicensed band channel to the base station.

13 Claims, 9 Drawing Sheets

(51) Int. Cl.
*H04W 76/10* (2018.01)
*H04W 76/20* (2018.01)
*H04W 16/32* (2009.01)
*H04W 68/00* (2009.01)
*H04W 88/18* (2009.01)
*H04W 92/12* (2009.01)
*H04W 76/30* (2018.01)
*H04W 16/14* (2009.01)
*H04W 72/08* (2009.01)
*H04W 76/15* (2018.01)
*H04L 5/00* (2006.01)
*H04W 36/00* (2009.01)
*H04W 88/08* (2009.01)

(52) U.S. Cl.
CPC ....... *H04W 36/0027* (2013.01); *H04W 68/00* (2013.01); *H04W 72/042* (2013.01); *H04W 72/0446* (2013.01); *H04W 72/082* (2013.01); *H04W 76/10* (2018.02); *H04W 76/15* (2018.02); *H04W 76/20* (2018.02); *H04W 76/30* (2018.02); *H04W 88/18* (2013.01); *H04W 92/12* (2013.01); *H04W 88/08* (2013.01)

(56) References Cited

U.S. PATENT DOCUMENTS

| | | | | |
|---|---|---|---|---|
| 2015/0172034 A1* | 6/2015 | Kishiyama | ............ | H04W 36/00 370/329 |
| 2015/0245219 A1* | 8/2015 | Wei | ........................ | H04W 16/14 370/336 |
| 2015/0341921 A1* | 11/2015 | Chen | ................. | H04W 72/0413 370/330 |
| 2016/0373235 A1* | 12/2016 | Oh | ........................... | H04L 1/18 |

OTHER PUBLICATIONS

3rd Generation Partnership Project; Technical Specification Group Radio Access Network; Study on Licensed-Assisted Access to Unlicensed Spectrum; 3GPP TR 36.889 V0.1.1; Nov. 2014; pp. 1-40; Release 13; 3GPP Organizational Partners.

NTT DOCOMO; Views on issues related to LAA UL; 3GPP TSG RAN WG1 Meeting #79; R1-144970; Nov. 17-21, 2014; pp. 1-4; San Francisco, USA.

Intel Corporation; On the LAA uplink: scheduling, LBT, and HARQ; 3GPP TSG RAN WG1 Meeting #80; R1-150507; Feb. 9-13, 2015; pp. 1-4; Athens, Greece.

* cited by examiner

USER TERMINAL AND BASE STATION FOR PERFORMING UPLINK TRANSMISSION IN AN UNLICENSED BAND

TECHNICAL FIELD

The present application relates to a user terminal and a base station used in a mobile communication system.

BACKGROUND ART

In 3GPP (3rd Generation Partnership Project), which is a project aiming to standardize a mobile communication system, attempts are being made to enhance LTE (Long Term Evolution) to comply with rapidly increasing traffic demands.

As one of such attempts, it has been discussed to use not only a frequency band for which a license is granted to an operator (licensed band) but also a frequency band for which a license is not required (unlicensed band) for LTE communication.

In the unlicensed band, in order to avoid interference with another system (such as wireless LAN) different from an LTE system or an LTE system of another operator, a listen-before-talk (LBT) procedure is requested.

The LBT procedure is a procedure in which whether or not a frequency channel (carrier) of the unlicensed band is available is checked, based on the received power (interference power), and only if the channel is confirmed to be a clear channel, the frequency channel is used (See Non Patent Document 1).

PRIOR ART DOCUMENT

Non-Patent Document

Non Patent Document 1: 3GPP technical report "TR 36.889 V0.1.1" November, 2014

SUMMARY OF THE INVENTION

A user terminal according to a first aspect is used in a mobile communication system. The user terminal comprises: a receiver configured to receive, from a base station, candidate timing information indicating candidate timings of an uplink transmission on an unlicensed band channel that is a frequency channel of an unlicensed band; a controller configured to determine, by monitoring the unlicensed band channel, a transmission timing at which the uplink transmission to the base station is performed, from the candidate timings indicated by the candidate timing information; and a transmitter configured to transmit, at the transmission timing, uplink data via the unlicensed band channel to the base station.

A base station according to a second aspect is used in a mobile communication system. The base station comprises: a transmitter configured to transmit, to a user terminal, candidate timing information indicating candidate timings of an uplink transmission on an unlicensed band channel that is a frequency channel of an unlicensed band; and a receiver configured to receive uplink data, from the user terminal, via the unlicensed band channel, at a transmission timing determined by the user terminal out of the candidate timings indicated by the candidate timing information.

DESCRIPTION OF THE EMBODIMENT

[Overview of Embodiment]

Figure 1:
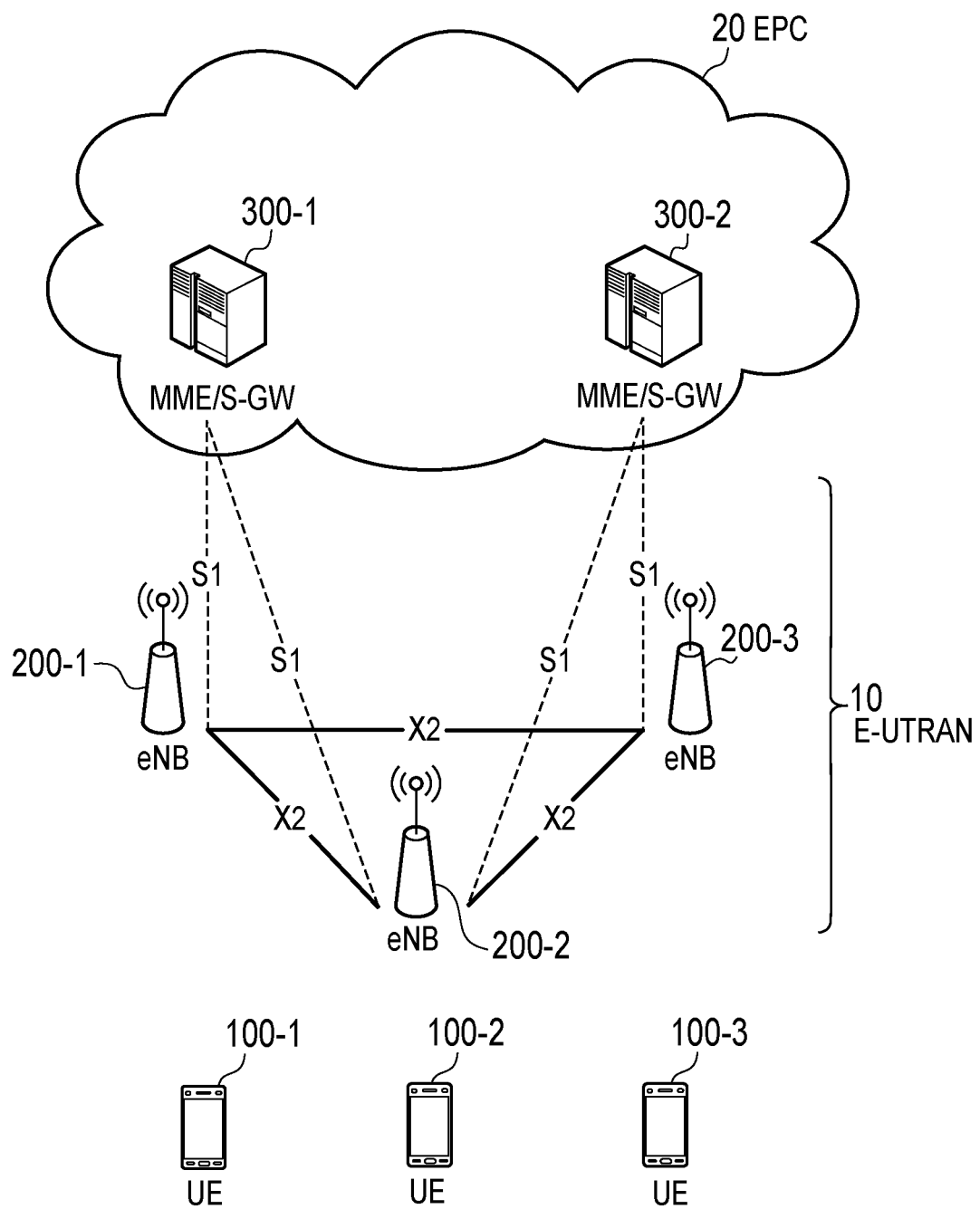
FIG. 1 is a configuration diagram of a mobile communication system (an LTE system) according to a first embodiment to a third embodiment.

In a general uplink scheduling of LTE, a base station transmits uplink scheduling information (UL Scheduling Grant) to a user terminal. The user terminal transmits uplink data to the base station in the fourth subframe subsequent to a subframe in which the "UL Scheduling Grant" is received. That is, the scheduling has a mechanism having a "transmission delay".

On the other hand, there is another system or another operator in a frequency channel of an unlicensed band (hereinafter referred to as "unlicensed band channel"), and thus, a propagation environment varies intensely compared to a licensed band.

Therefore, if the mechanism of the general uplink scheduling of LTE is applied to the unlicensed band channel as it is, it is difficult to perform appropriate uplink communication, due to the above-described transmission delay.

Therefore, an embodiment provides a user terminal and a base station by which it is possible to appropriately perform uplink communication in an unlicensed band.

A user terminal according to a first embodiment to a third embodiment is used in a mobile communication system. The user terminal comprises: a receiver configured to receive, from a base station, candidate timing information indicating candidate timings of an uplink transmission on an unlicensed band channel that is a frequency channel of an unlicensed band; a controller configured to determine, by monitoring the unlicensed band channel, a transmission timing at which the uplink transmission to the base station is performed, from the candidate timings indicated by the candidate timing information; and a transmitter configured to transmit, at the transmission timing, uplink data via the unlicensed band channel to the base station.

In the first embodiment to the third embodiment, the receiver receives, from the base station, the candidate timing information transmitted via a licensed band.

In the first embodiment to the third embodiment, the transmitter transmits the uplink data by using an entire band of the unlicensed band channel.

In the second embodiment, the transmitter transmits, to the base station, a notification signal indicating that the uplink data is transmitted via the unlicensed band channel, via the licensed band.

In the third embodiment, the transmitter transmits, together with the uplink data, identification information of the user terminal, via the unlicensed band channel.

In a modification of the third embodiment, the transmitter transmits, via the unlicensed band channel, the uplink data scrambled by the identification information of the user terminal.

A base station according to the first embodiment to the third embodiment is used in a mobile communication system. The base station comprises: a transmitter configured to transmit, to a user terminal, candidate timing information indicating candidate timings of an uplink transmission on an unlicensed band channel that is a frequency channel of an unlicensed band; and a receiver configured to receive uplink data, from the user terminal, via the unlicensed band channel, at a transmission timing determined by the user terminal out of the candidate timings indicated by the candidate timing information.

In the first embodiment to the third embodiment, the transmitter transmits, via a licensed band, to the user terminal, the candidate timing information.

In the first embodiment to the third embodiment, the receiver receives the uplink data transmitted by using an entire band of the unlicensed band channel.

In the second embodiment, the receiver receives, from the user terminal, via a licensed band, a notification signal indicating that the uplink data is transmitted via the unlicensed band channel.

In the third embodiment, the receiver receives, together with the uplink data, identification information of the user terminal, via the unlicensed band channel.

In a modification of the third embodiment, the receiver receives, via the unlicensed band channel, the uplink data scrambled by the identification information of the user terminal.

[First Embodiment]
(Mobile Communication System)

Hereinafter, the LTE system being a mobile communication system according to a first embodiment will be described. FIG. 1 is a configuration diagram of an LTE system according to the first present embodiment.

As illustrated in FIG. 1, the LTE system comprises UEs (User Equipments) 100, E-UTRAN (Evolved-UMTS Terrestrial Radio Access Network) 10, and EPC (Evolved Packet Core) 20.

The UE 100 corresponds to the user terminal. The UE 100 is a mobile communication apparatus and performs radio communication with a cell (a serving cell). Configuration of UE 100 will be described later.

The E-UTRAN 10 corresponds to a radio access network. The E-UTRAN 10 includes a plurality of eNBs 200 (evolved Node-Bs). The eNB 200 corresponds to a base station. The eNBs 200 are connected mutually via an X2 interface. Configuration of eNB 200 will be described later.

The eNB 200 manages one cell or a plurality of cells and performs radio communication with the UE 100 that establishes a connection with the cell. The eNB 200 has a radio resource management (RRM) function, a routing function of user data (hereinafter, simply referred to as "data"), and a measurement control function for mobility control and scheduling and the like. The "cell" is used as a term indicating a minimum unit of a radio communication area, and is also used as a term indicating a function of performing radio communication with the UE 100.

The EPC 20 corresponds to a core network. The EPC 20 includes MMEs (Mobility Management Entities)/S-GWs (Serving-Gateways) 300. The MME performs various mobility controls and the like, for the UE 100. The S-GW performs transfer control of data. The MME/S-GW 300 is connected to the eNB 200 via an S1 interface. The E-UTRAN 10 and the EPC 20 constitute a network.

Figure 2:
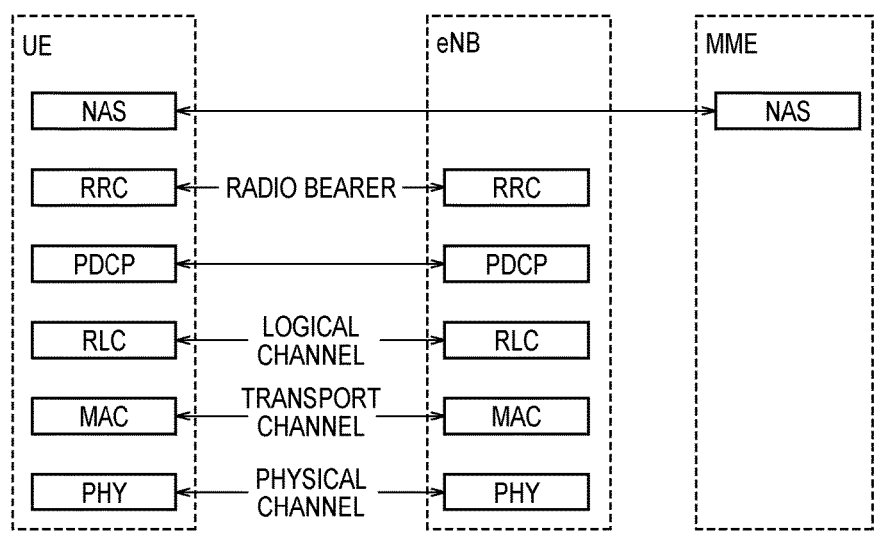
FIG. 2 is a protocol stack diagram of a radio interface according to the first embodiment to the third embodiment.

FIG. 2 is a protocol stack diagram of a radio interface in the LTE system. As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted through the physical channel.

The MAC layer performs preferential control of data, a retransmission process by hybrid ARQ (HARQ), a random access procedure, and the like. Between the MAC layer of the UE 100 and the MAC layer of the eNB 200, data and control signal are transmitted via a transport channel. The MAC layer of the eNB 200 includes a scheduler for determining a transport format of an uplink and a downlink (a transport block size, a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane which treats the control signal. Between the RRC layer of the UE 100 and the RRC layer of the eNB 200, a message (an RRC message) for various types of configurations is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in a RRC connected state, and when the RRC connection is not established, the UE 100 is in an RRC idle state.

A NAS (Non-Access Stratum) layer positioned above the RRC layer performs session management and mobility management, for example.

Figure 3:
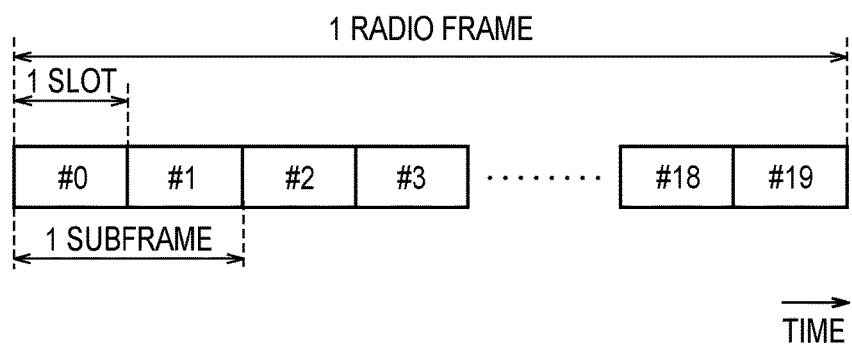
FIG. 3 is a configuration diagram of a radio frame according to the first embodiment to the third embodiment.

FIG. 3 is a configuration diagram of a radio frame used in the LTE system. In the LTE system, OFDMA (Orthogonal Frequency Division Multiplexing Access) is applied in a downlink, and SC-FDMA (Single Carrier Frequency Division Multiple Access) is applied in an uplink, respectively.

As illustrated in FIG. 3, the radio frame (system frame) is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. A radio resource element (RE) is configured by one subcarrier and one symbol. Among radio resources assigned to the UE 100, a frequency resource can be specified by a resource block and a time resource can be specified by a subframe (or slot).

In the downlink, an interval of several symbols at the head of each subframe is a region mainly used as a physical downlink control channel (PDCCH) for transmission of a downlink control signal. Details of the PDCCH will be described below. Furthermore, the remaining part of each subframe is a region mainly used as a physical downlink shared channel (PDSCH) for transmission of a downlink data.

In the uplink, both end portions in the frequency direction of each subframe are regions mainly used as a physical uplink control channel (PUCCH) for transmission of an uplink control signal. Furthermore, the center portion in the frequency direction of each subframe is a region that can be mainly used as a physical uplink shared channel (PUSCH) for transmission of an uplink data.

(Unlicensed Band)

In the LTE system according to the first embodiment, not only a licensed band for which the license is granted to an operator, but also an unlicensed band for which the license is not required is used, for LTE communication. Specifically, with an aid of the licensed band, it is possible to access the unlicensed band. Such mechanism is referred to as a licensed-assisted access (LAA).

Figure 4:
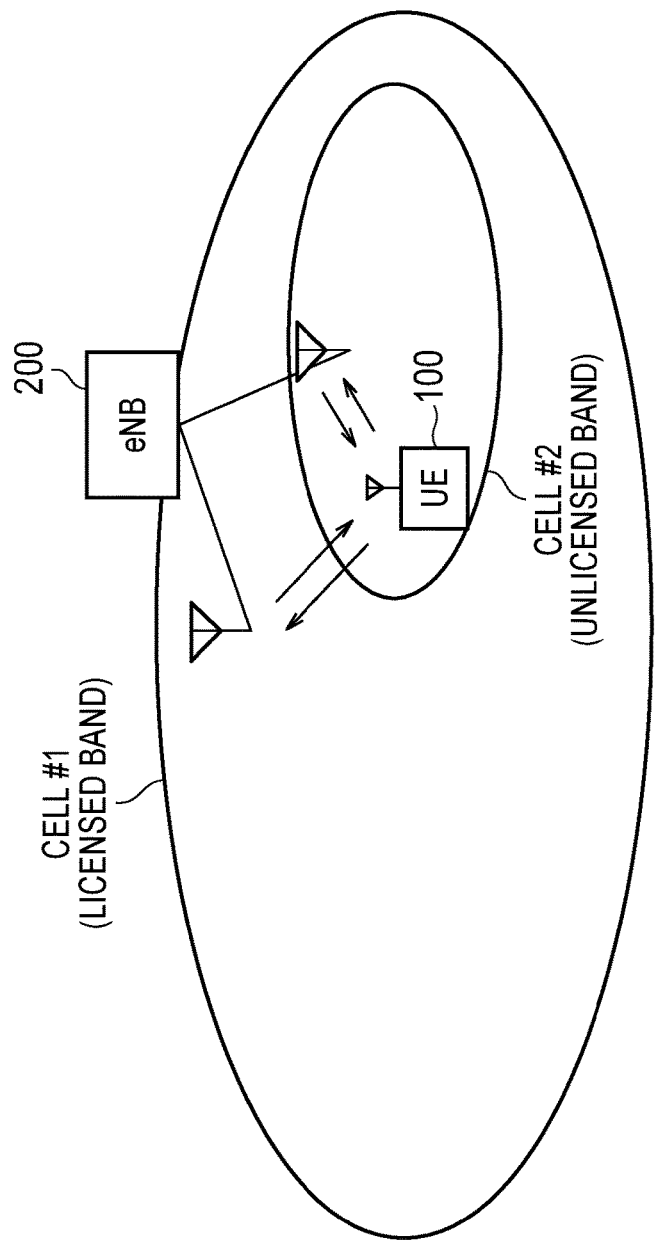
FIG. 4 is a diagram for describing an unlicensed band according to the first embodiment to the third embodiment.

FIG. 4 is a diagram for describing the LAA. As illustrated in FIG. 4, the eNB 200 manages a cell #1 operated in the licensed band and a cell #2 operated in the unlicensed band. In FIG. 4, an example is illustrated where the cell #1 is a macro cell and the cell #2 is a small cell, but a cell size is not limited to this.

The UE 100 is positioned in an overlapping area of the cell #1 and the cell #2. The UE 100 sets the cell #1 as a primary cell (PCell), while setting the cell #2 as a secondary cell (SCell) and performs communication by a carrier aggregation (CA).

In the example of FIG. 4, the UE 100 performs uplink communication and downlink communication with the cell #1 and uplink communication and downlink communication with the cell #2. By such a carrier aggregation, the UE 100 is provided with, in addition to a radio resource of the licensed band, a radio resource of the unlicensed band, and thus, the UE 100 can improve a throughput.

(User Terminal)

Figure 5:
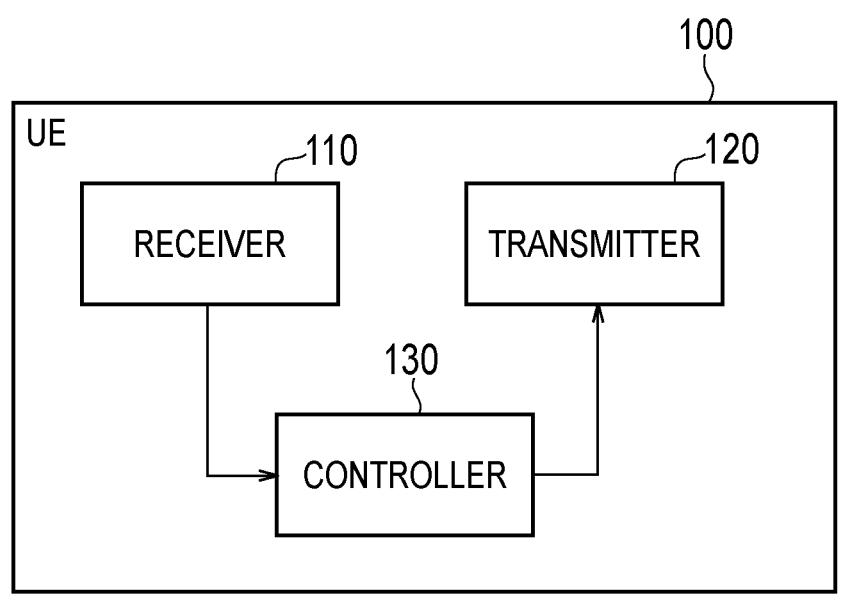
FIG. 5 is a block diagram of a user terminal (UE) according to the first embodiment to the third embodiment.

The UE 100 (user terminal) according to the first embodiment will be described below. FIG. 5 is a block diagram illustrating a configuration of the UE 100. As illustrated in FIG. 5, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (reception signal), and outputs the baseband signal to the controller 130. The receiver 110 may include a first receiver unit configured to receive ae radio signal in the licensed band, and a second receiver unit configured to receive a radio signal in the unlicensed band.

The transmitter 120 performs various types of transmissions under the control of the controller 130. The transmitter 120 includes an antenna and a transmitter unit. The transmitter unit converts a baseband signal (transmission signal) output from the controller 130 into a radio signal, and transmits the radio signal from the antenna. The transmitter 120 may include a first transmitter unit configured to transmit a radio signal in the licensed band, and a second transmitter unit configured to transmit a radio signal in the unlicensed band.

The controller 130 performs various types of controls in the UE 100. The controller 130 includes a processor and a memory. The memory stores a program executed by the processor, and information used for a process by the processor. The processor includes a baseband processor configured to perform modulation and demodulation, encoding and decoding and the like on the baseband signal, and a CPU (Central Processing Unit) configured to execute the program stored in the memory to perform various types of processes. The processor may include a codec configured to perform encoding and decoding on sound and video signals. The processor executes various types of processes described later, and various types of communication protocols described above.

An operation overview of the UE 100 thus configured will be described.

The receiver 110 receives candidate timing information indicating candidate timings of an uplink transmission on an unlicensed band channel, which is a frequency channel of the unlicensed band, from the eNB 200. In the first embodiment, the receiver 110 receives the candidate timing information transmitted from the eNB 200, via the licensed band.

The controller 130 determines, by monitoring the unlicensed band channel, the transmission timing at which the uplink transmission to the eNB 200 is performed, from the candidate timings indicated by the candidate timing information.

The transmitter 120 transmits, at the determined transmission timing, uplink data to the eNB 200 via the unlicensed band channel. The transmitter 120 may use the entire band of the unlicensed band channel to transmit the uplink data.

(Base Station)

Figure 6:
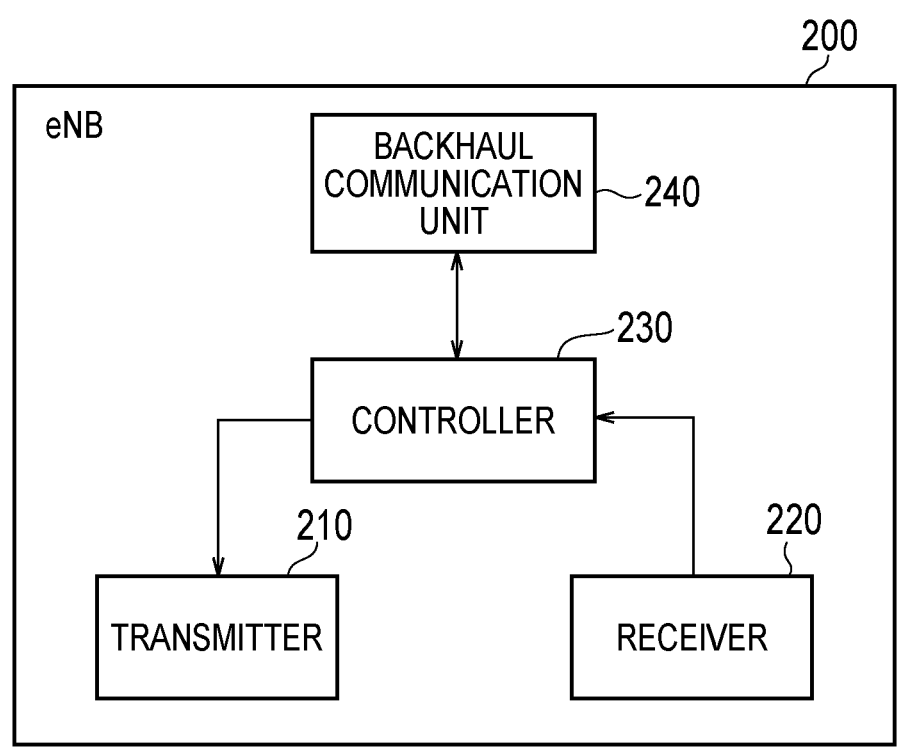
FIG. 6 is a block diagram of a base station (eNB) according to the first embodiment to the third embodiment.

A configuration of the eNB 200 (base station) will be described, below. FIG. 6 is a block diagram of the eNB 200. As illustrated in FIG. 6, the eNB 200 includes: a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmission signal) output from the controller 230 into a radio signal, and transmits the radio signal from the antenna. The transmitter 210 may include a first transmitter unit configured to transmit a radio signal in the licensed band, and a second transmitter unit configured to transmit a radio signal in the unlicensed band.

The receiver 220 performs various types of receptions under the control of the controller 230. The receiver 220 includes an antenna and a receiver unit. The receiver unit converts a radio signal received by the antenna into a baseband signal (reception signal), and outputs the baseband signal to the controller 230. The receiver 220 may include a first receiver unit configured to receive a radio signal in the licensed band, and a second receiver unit configured to receive a radio signal in the unlicensed band.

The controller 230 performs various types of controls in the eNB 200. The controller 230 includes a processor and a memory. The memory stores a program executed by the processor, and information used for a process by the processor. The processor includes a baseband processor configured to perform modulation and demodulation, encoding and decoding and the like on the baseband signal, and a CPU (Central Processing Unit) configured to execute the program stored in the memory to perform various types of processes. The processor executes various types of processes described later, and various types of communication protocols described above.

The backhaul communication unit 240 is connected to a neighboring eNB 200 via the X2 interface and to the MME/S-GW 300 via the S1 interface. The backhaul communication unit 240 is used for communication performed on the X2 interface and communication performed on the S1 interface and the like.

An operation overview of the eNB 200 thus configured will be described.

The transmitter 210 transmits, to the UE 100, candidate timing information indicating candidate timings of uplink transmission on the unlicensed band channel. In the first embodiment, the transmitter 210 transmits the candidate timing information to the UE 100, via the licensed band.

The receiver 220 receives, at the transmission timing determined by the UE 100 from the candidate timings indicated by the candidate timing information, the uplink data from the UE 100 via the unlicensed band channel. The receiver 220 may use the entire band of the unlicensed band channel to receive the transmitted uplink data.

(Operation Sequence)

Figure 7:
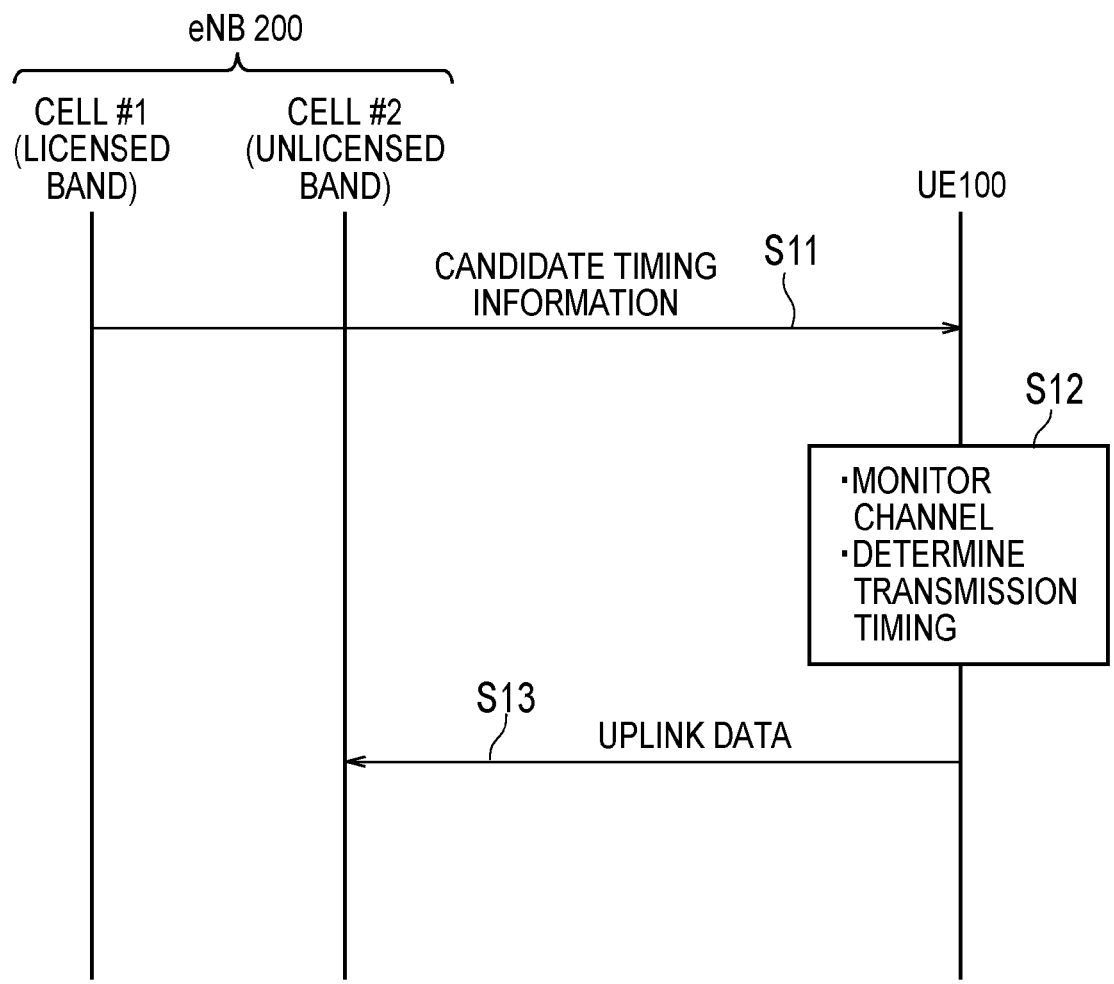
FIG. 7 is a diagram illustrating an operation sequence according to the first embodiment.

An operation sequence according to the first embodiment will be described, below. FIG. 7 is a diagram illustrating the operation sequence according to the first embodiment.

As illustrated in FIG. 7, in step S11, the eNB 200 transmits the candidate timing information to the UE 100 via the cell #1 operated in the licensed band. The UE 100 receives the candidate timing information. The candidate timing information is information indicating the candidate timings of the uplink transmission on the unlicensed band channel.

The candidate timing information may be TDD setting information. If the unlicensed band channel is a TDD channel (TDD carrier), a component rate of the downlink subframe and the uplink subframe in the radio frame and a temporal position thereof may take various patterns (subframe configuration patterns). The TDD setting information is information for specifying one subframe configuration pattern out of a plurality of subframe configuration patterns. In this case, the uplink subframe in the radio frame corresponds to a candidate timing of the uplink transmission.

Alternatively, the candidate timing information may be a bit map indicating candidate timings of the uplink transmission in a unit of subframe. For example, in one or more radio frames, a candidate subframe for the uplink transmission is expressed as "1", and a subframe in which the uplink transmission is prohibited is expressed as "0". If a first subframe is a "candidate subframe for uplink transmission", and the second and the third subframes are a "subframe in which uplink transmission is prohibited", then the bit map is "1", "0", "0", . . . . The candidate timing information may include information indicating a period during which the pattern corresponding to the bit map is valid (the number of radio frames in which the pattern is valid). Alternatively, a period during which the pattern is valid may be previously set.

Alternatively, the candidate timing information is information for specifying a pattern of a combination of (one or more) radio frames and (one or more) subframes as the candidate timings of the uplink transmission. The plurality of combination patterns are previously set to specify one combination pattern by the candidate timing information. For example, a pattern of (odd-numbered/even-numbered/both) radio frames and subframes (for which multiple selection of 0 to 9 is possible) in the radio frame for transmission is established in advance. The candidate timing information is configured as an identifier to identify the pattern determined by the eNB 200. The candidate timing information may include information indicating a period during which the pattern is valid (the number of radio frames in which the patterns is valid). Alternatively, a period during which the pattern is valid may be previously set.

In the first embodiment, the eNB 200 may set (transmit) the candidate timing information to each UE 100, so that the candidate timings do not overlap between a plurality of UEs 100 to which the LAA is applied. That is, a dedicated candidate timing is set to each UE 100. In this case, the eNB 200 may transmit, to the UE 100, the candidate timing information by unicast. For example, the eNB 200 transmits the candidate timing information to the UE 100 by an individual RRC message.

It is noted that although an example is described where the candidate timings are set in a unit of subframe, the candidate timings may be set in a unit of slot (or in a unit of even shorter time).

In step S12, the UE 100 determines, by monitoring the unlicensed band channel, the transmission timing at which the uplink transmission to the eNB 200 is performed, from the candidate timings indicated by the candidate timing information. For example, the UE 100 checks whether or not the unlicensed band channel is available, based on the received power, and determines, among the candidate timings, a timing at which the channel is confirmed to be a clear channel as the transmission timing.

In step S13, the UE 100 transmits, at the transmission timing determined in step S12, the uplink data to the eNB 200 via the unlicensed band channel. The UE 100 may use the entire band of the unlicensed band channel to transmit the uplink data.

The eNB 200 receives the uplink data via the cell #2 (unlicensed band). If the dedicated candidate timing is set to each UE 100, the eNB 200 may identify a UE 100 from which the uplink data is transmitted, based on the timing of the uplink data.

(Summary of First Embodiment)

As described above, the UE 100 determines, by monitoring the unlicensed band channel, the transmission timing at which the uplink transmission to the eNB 200 is performed, from the candidate timings indicated by the candidate timing information.

In this manner, the UE 100 autonomously determines the transmission timing, so that transmission delay is small compared to the general uplink scheduling of LTE, or transmission delay does not occur. Therefore, appropriate uplink communication can be performed even in the unlicensed band where a propagation environment varies intensely.

Further, when the selection of the transmission timings is limited by the candidate timing information, it is possible to reduce the possibility of determination of identical transmission timings by the plurality of UEs 100.

In particular, when the candidate timing information is set to each UE 100 so that the candidate timings do not overlap among the plurality of UEs 100, the eNB 200 can identify each UE 100, based on the transmission timing of each UE 100.

[Modification of First Embodiment]

In the above-described first embodiment, a case is assumed where the unlicensed band channel used in the LAA is previously set. However, the unlicensed band channel used in the LAA may be selectively set from the plurality of frequency channels included in the unlicensed band.

For example, if the eNB 200 determines the unlicensed band channel used in the LAA, the eNB 200 transmits, to the UE 100, together with the candidate timing information, the information indicating the unlicensed band channel. The UE 100 uses the unlicensed band channel specified by the eNB 200 for the uplink transmission. In that case, the UE 100 determines a transmission timing, based on the candidate timing information corresponding to the specified channel.

Alternatively, if the UE 100 determines the unlicensed band channel used in the LAA, the eNB 200 transmits, to the UE 100, the candidate timing information for each of the plurality of the unlicensed band channels. The UE 100 searches for a clear channel from the plurality of the unlicensed band channels, and uses the searched channel for the uplink transmission. In this case, the UE 100 determines a transmission timing, based on the candidate timing information corresponding to the searched channel.

[Second Embodiment]

A second embodiment will be described with a particular focus on a difference from the first embodiment.

In the second embodiment, the transmitter 120 of the UE 100 transmits, to the eNB 200 via the licensed band, a notification signal indicating that the uplink data is transmitted via the unlicensed band channel.

In the second embodiment, the receiver 220 of the eNB 200 receives, from the UE 100 via the licensed band, the notification signal indicating that the uplink data is transmitted via the unlicensed band channel.

Figure 8:
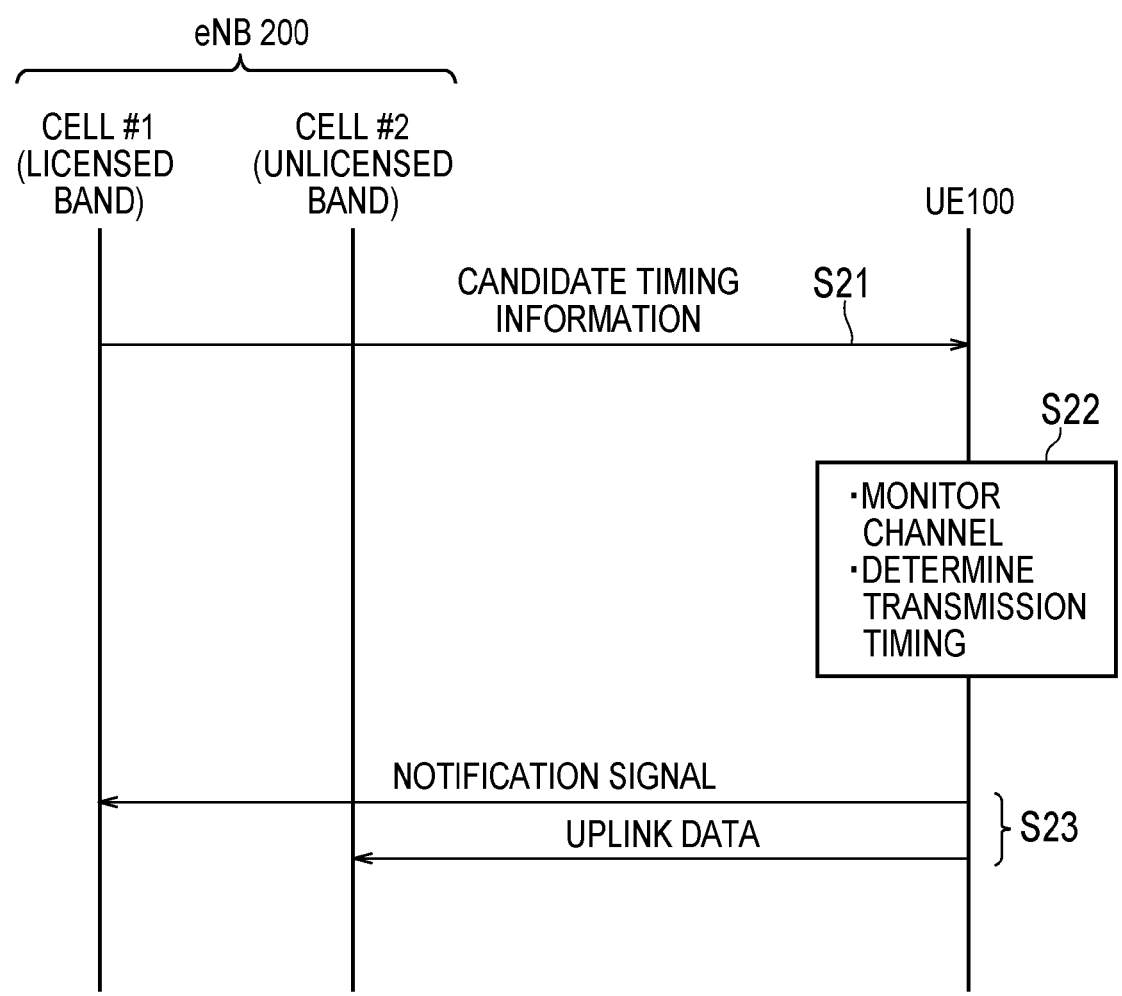
FIG. 8 is a diagram illustrating an operation sequence according to the second embodiment.

FIG. 8 is a diagram illustrating an operation sequence according to the second embodiment.

As illustrated in FIG. 8, operations in step S21 and step S22 are similar to those in the first embodiment. However, in the second embodiment, the dedicated candidate timing may not be set for each UE 100. Further, the eNB 200 may transmit, to the UE 100, information indicating a resource (such as a radio resource and a signal sequence) for use in transmitting the notification signal.

It is noted that in the second embodiment, the eNB 200 may transmit, instead of transmitting the candidate timing information by unicast, the candidate timing information by broadcast. For example, the candidate timing information is transmitted to the UE 100 by a common RRC message (for example, SIB).

After the transmission timing of the uplink data has been determined, in step S23, the UE 100 transmits the notification signal to the eNB 200 via the cell #1 (licensed band). The eNB 200 receives the notification signal. The eNB 200 performs a process (preparation) for receiving the uplink data from the UE 100, based on the notification signal.

Further, the UE 100 transmits the uplink data to the eNB 200 via the cell #2 (unlicensed band). The UE 100 may use the entire band of the unlicensed band channel to transmit the uplink data.

In the present sequence, the UE 100 transmits the notification signal simultaneously of the transmission of the uplink data or immediately before the transmission of the uplink data. The notification signal may be a signal (synchronization signal or reference signal) added to a head position of the uplink data. Alternatively, the notification signal may be a control signal transmitted on the PUCCH. A resource dedicated to UE may be used for transmitting these signals.

Alternatively, the UE 100 may transmit the notification signal at a timing earlier by a predetermined offset time than the transmission of the uplink data. The offset time may be previously set, or may be specified by the eNB 200.

Alternatively, the UE 100 may transmit the notification signal at a timing later by a predetermined offset time than the transmission of the uplink data. In this case, the eNB 200 stores the received uplink data and waits for reception of the notification signal. If the offset time passes without receiving the notification signal, the stored uplink data is discarded. The offset time may be previously set, or may be specified by the eNB 200.

In this manner, according to the second embodiment, the UE 100 transmits the notification signal indicating that the uplink data is transmitted via the unlicensed band channel, to the eNB 200 via the licensed band. Thereby, even if the UE 100 determines the transmission timing of the uplink data, the eNB 200 can appropriately receive the uplink data. Further, the eNB 200 can identify each UE 100, based on the notification signal.

[Third Embodiment]

A third embodiment will be described with a particular focus on a difference from the first embodiment and the second embodiment.

In the third embodiment, the transmitter 120 of the UE 100 transmits, together with the uplink data, the identification information of the UE 100, via the unlicensed band channel.

In the third embodiment, the receiver 220 of the eNB 200 receives, together with the uplink data, the identification information of the UE 100, via the unlicensed band channel.

Figure 9:
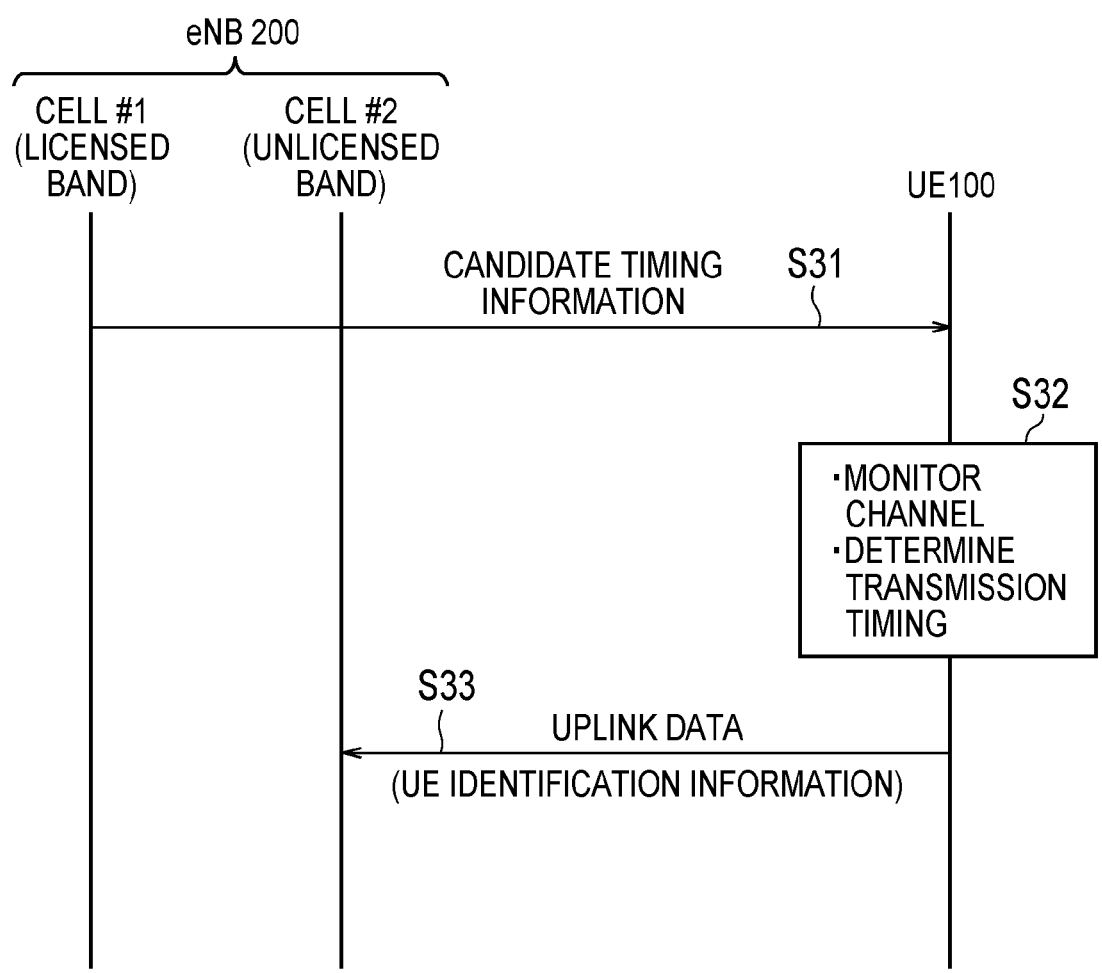
FIG. 9 is a diagram illustrating an operation sequence according to the third embodiment.

FIG. 9 is a diagram illustrating an operation sequence according to the third embodiment.

As illustrated in FIG. 9, operations in steps S31 and S32 are similar to those in the first embodiment. However, in the third embodiment, instead of transmitting the candidate timing information by unicast, the eNB 200 may transmit the candidate timing information by broadcast.

In step S33, the UE 100 transmits the uplink data to the eNB 200 via the cell #2 (unlicensed band). In this case, the UE 100 adds the identification information of the UE 100 to the uplink data.

The identification information of the UE 100 may be a C-RNTI (Cell-Radio Network Temporary Identifier) assigned by the eNB 200 to the UE 100. The identification information of the UE 100 may be added at the head of the uplink data as a header. The header is designed to be decoded by any eNB 200 or any UE 100.

The eNB 200 receives the identification information of the UE 100, together with the uplink data, from the UE 100. The eNB 200 identifies the UE 100, based on the identification information.

In this manner, according to the third embodiment, the UE 100 transmits the identification information of the UE 100, together with the uplink data, via the unlicensed band channel. As a result, even if the UE 100 determines the transmission timing of the uplink data, the eNB 200 can identify each UE 100, based on the notification signal.

[Modification of Third Embodiment]

It may not be preferable, from the viewpoint of security, that the identification information of the UE 100 is known by a third party.

Therefore, in a modification of the third embodiment, the transmitter 120 of the UE 100 transmits the uplink data scrambled by the identification information of the UE 100 (for example, C-RNTI) via the unlicensed band channel. Specifically, a CRC bit of the uplink data is scrambled by the identification information of the UE 100. Alternatively, not only the CRC bit, but also the entire uplink data may be scrambled.

In the modification of the third embodiment, the receiver 220 of the eNB 200 receives the uplink data scrambled by the identification information of the UE 100, via the unlicensed band channel. Further, the eNB 200 attempts to decode the CRC bit (and uplink data) by the identification information of each candidate UE 100, and identifies the UE 100 from which the uplink data is transmitted, based on the identification information at the time of a successful decoding.

[Other Embodiments]

The UE 100 determines the transmission timing, based on the received power on the unlicensed band channel. However, The UE 100 may determine the transmission timing by taking into account the header received on the unlicensed band channel.

The above-described first embodiment to third embodiment are not limited to a case where they are separately and independently carried out. Two or more embodiments of the first embodiment to the third embodiment may be combined to be carried out.

In the above-described first embodiment to the third embodiment, examples where an identical eNB 200 manages the cell #1 (licensed band) and the cell #2 (unlicensed band) were described. However, the present application can be also applied to a case where a different eNB 200 manages the cell #1 (licensed band) and the cell #2 (unlicensed band).

In the above-described first embodiment to the third embodiment, the LTE system is exemplified as the mobile communication system. However, the present application is not limited to the LTE system. The present application may be applied to systems other than the LTE system.

[Cross Reference to Related Applications]

The entire content of U.S. Provisional Application No. 62/112,764 (filed on Feb. 6, 2015) is incorporated into the present specification by reference.

INDUSTRIAL APPLICABILITY

The present application is useful in the field of communication.

The invention claimed is:

1. A user terminal used in a mobile communication system, comprising:
a receiver;
a controller; and
a transmitter, wherein
the receiver is configured to receive, from a base station, information indicating unlicensed band channels of an unlicensed band, the information further indicating candidate timings of an uplink transmission corresponding to each of the unlicensed band channels;
the controller is configured to monitor the unlicensed band channels;
the controller is further configured to determine, based on received powers of the unlicensed band channels, an unlicensed band channel to be used for the uplink transmission, from the unlicensed band channels;
the controller is further configured to determine a transmission timing at which the uplink transmission to the base station is performed on the determined unlicensed band channel, from the candidate timings corresponding to the determined unlicensed band channel; and
the transmitter is configured to transmit, at the determined transmission timing, uplink data via the determined unlicensed band channel to the base station.

2. The user terminal according to claim 1, wherein the receiver receives, from the base station, the candidate timing information transmitted via a licensed band.

3. The user terminal according to claim 1, wherein the transmitter transmits the uplink data by using an entire band of the determined unlicensed band channel.

4. The user terminal according to claim 1, wherein the transmitter transmits, to the base station, via a licensed band, a notification signal indicating that the uplink data is transmitted via the determined unlicensed band channel.

5. The user terminal according to claim 1, wherein the transmitter transmits, together with the uplink data, identification information of the user terminal, via the determined unlicensed band channel.

6. The user terminal according to claim 1, wherein the transmitter transmits, via the determined unlicensed band channel, the uplink data scrambled by the identification information of the user terminal.

7. The user terminal according to claim 1, wherein
the transmitter is configured to transmit a notification signal indicating that the uplink data is transmitted via the determined unlicensed band channel to the base station via a licensed band, the notification signal being transmitted at a timing later by a predetermined offset time than the transmission of the uplink data,
the predetermined offset time is specified by the base station, and
the base station discards the uplink data received from the user terminal when the predetermined offset time passes without receiving the notification signal.

8. A communication method, comprising:
transmitting from a base station to a user terminal, information indicating unlicensed band channels of an unlicensed band, the information further indicating candidate timings of an uplink transmission corresponding to each of the unlicensed band channels;
monitoring the unlicensed band channels, by the user terminal;
determining, by the user terminal, based on received powers of the unlicensed band channels, an unlicensed band channel to be used for the uplink transmission, from the unlicensed band channels;
determining, by the user terminal, a transmission timing at which the uplink transmission to the base station is performed on the determined unlicensed band channel, from the candidate timings corresponding to the determined unlicensed band channel; and
transmitting, by the user terminal, at the determined transmission timing, uplink data via the determined unlicensed band channel to the base station.

9. The base station according to claim 8, wherein the transmitter transmits, via a licensed band, to the user terminal, the candidate timing information.

10. The base station according to claim 8, wherein the receiver receives the uplink data transmitted by using an entire band of the determined unlicensed band channel.

11. The base station according to claim 8, wherein the receiver receives, from the user terminal, via a licensed band, a notification signal indicating that the uplink data is transmitted via the determined unlicensed band channel.

12. The base station according to claim 8, wherein the receiver receives, together with the uplink data, identification information of the user terminal, via the determined unlicensed band channel.

13. The base station according to claim 8, wherein the receiver receives, via the determined unlicensed band channel, the uplink data scrambled by the identification information of the user terminal.

* * * * *